July 8, 1958  R. L. CAMPBELL  2,842,318
VALVE
Filed Feb. 2, 1956  2 Sheets-Sheet 1
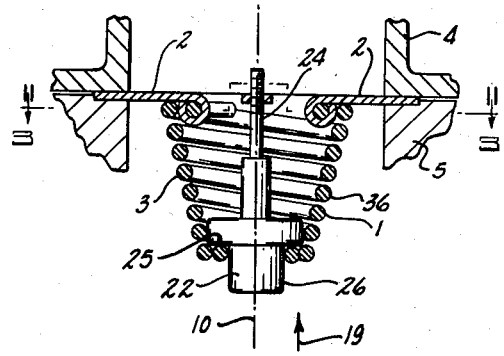
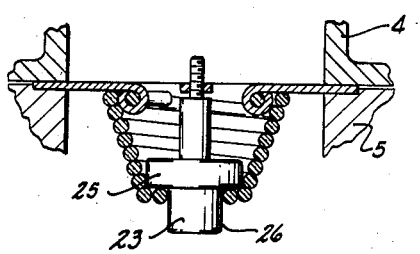
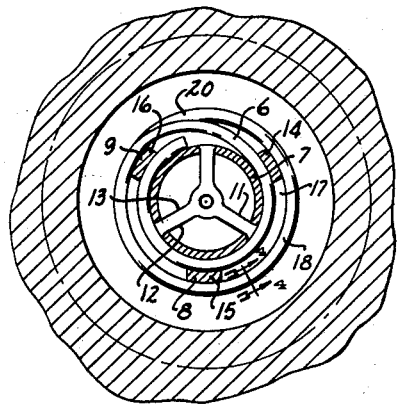 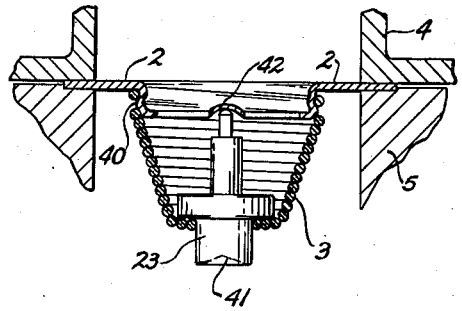
INVENTOR.
RICHARD L. CAMPBELL
BY
SMITH, OLSEN & KOTTS July 8, 1958     R. L. CAMPBELL     2,842,318
VALVE
Filed Feb. 2, 1956     2 Sheets-Sheet 2
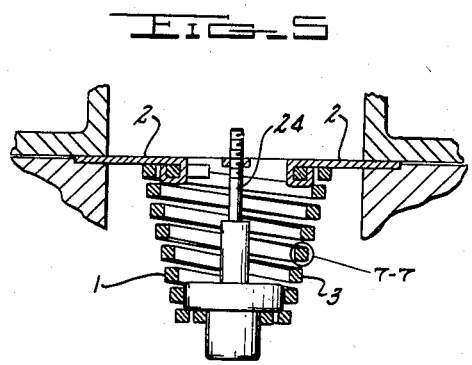
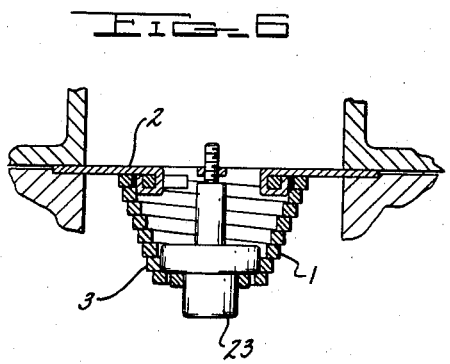
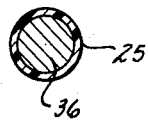 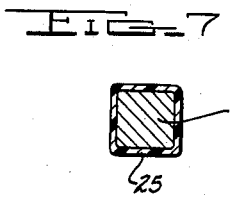
INVENTOR.
RICHARD L. CAMPBELL
BY
SMITH, OLSEN & KOTTS

United States Patent Office 2,842,318
Patented July 8, 1958

2,842,318
VALVE

Richard Lyons Campbell, Birmingham, Mich., assignor, by mesne assignments, to American Radiator & Standard Sanitary Corporation, New York, N. Y., a corporation of Delaware Application February 2, 1956, Serial No. 563,057

6 Claims. (Cl. 236—34)

This invention relates to valves for controlling fluid flow, and more particularly to valves which are opened and closed by (1) the expansion and contraction of a thermally expansible material within a variable volume chamber or (2) the introduction and removal of a pressure-producing material from within a variable volume chamber. One use of the invention is as a mechanism for controlling the flow of cooling liquid in an internal combustion engine.

Objects of the invention are to provide a valve of the above mentioned type wherein:

(1) The valve may be constructed as a low cost item,
(2) The valve may be constructed of a minimum number of parts, and
(3) The valve parts may be economically fabricated.

Other objects of this invention will appear in the following description and appended claims, reference being had to the accompanying drawings forming a part of this specification wherein like reference characters designate corresponding parts in the several views.

In the drawings:

Fig. 1 is a sectional view of one embodiment of the invention, taken on line 1—1 in Fig. 3 with the valve in an open position, Fig. 2 is a sectional view in the same direction as Fig. 1 but with the valve in a closed position, Fig. 3 is a sectional view on line 3—3 in Fig. 1, Fig. 4 is a sectional view on line 4—4 in Fig. 3, Fig. 5 is a view taken in the same direction as Fig. 1 but showing a second embodiment of the invention, Fig. 6 is a view taken in the same direction as Fig. 5 but with the valve in a closed position, Fig. 7 is a sectional view on line 7—7 in Fig. 5.

Fig. 8 is a sectional view through a third embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In Figs. 1 through 3 there is shown a valve 1 including a support plate 2 and a tension coil spring 3. Support plate 2 is adapted to be immovably clamped between radiator pipe 4 and cylinder block 5 of an internal combustion engine. When valve 1 is in the Fig. 1 position fluid may flow therethrough in the arrow 19 direction. The spaces between coil convolutions 36 constitute the openable and closable ports of the valve.

In order that spring 3 may be correctly mounted on plate 2 the upper end portion of spring 3 spirals inwardly in a radial plane as at 6, and triangular portions 7, 8 and 9 of plate 2 are wrapped around the inwardly spiralled portions. The term "radial plane" is used herein to mean that the spiral is completely in a plane at right angles to axis 10, and has no directional component in the axis 10 direction.

Openings 11, 12 and 13 are formed in plate 2 by bending portions 7, 8 and 9 around spiral 6. These openings allow fluid flow through the valve when the valve is in the Fig. 1 position. End portions 14, 15 and 16 of triangular portions 7, 8 and 9 extend into space 17 between outermost coil 18 and spiral 6 so as to prevent fluid flow through space 17. In this connection it will be noted that portion 20 of coil 18 is below spiral 6 so that fluid would be free to flow through space 17 except for the presence of end portion 14.

In order to move spring 3 from its Fig. 2 position to its Fig. 1 position there is provided a pressure means 26 in the form of a variable volume chambered element 22 and thermally expansible material (not shown) within element 22. Pressure means 26 is similar to pressure means 58 in U. S. Patent No. 2,636,776, issued on April 28, 1953, to Serguis Vernet.

Chambered element 22 includes a chamber-forming wall portion 23 and a piston-like wall portion 24. Expansion of the thermally expansible material causes portion 23 to move downwardly on portion 24 from the Fig. 1 position to the Fig. 2 position. Portion 23 includes a shoulder 25 which seats against the end portion of spring 3 remote from plate 2. This end portion is spiralled inwardly in a radial plane to form the seat for shoulder 25.

Piston 24 is threaded into a threaded opening in plate 2 to an adjusted position wherein subsequent expansion of the thermally expansible material will give the desired movement to wall portion 23. Solder is applied between piston 24 and plate 2 to hold the piston in its adjusted position.

Pressure means 26 develops its pressure from expansion of a thermally expansible material, but the pressure could in some instances be developed by the introduction of pressure fluid from a remote source (not shown) as illustrated in Fig. 3 of U. S. Patent No. 2,534,497, issued on December 19, 1950, to John Albright.

The spring convolutions in the Fig. 1 construction are circular in cross section, and in order that adjacent convolutions will seat tightly together in the Fig. 2 position the coil convolutions are preferably coated with a deformable sealing material 25 such as vinyl resin, polytetrafluoroethylene resin, or rubber. The tension in the spring is sufficient to return the spring from its Fig. 1 position to its Fig. 2 position during contractive movement of the thermally expansible material.

The Fig. 5 construction is similar to the Fig. 1 construction except for the cross sectional contour of the spring convolutions, and similar reference numerals are employed wherever applicable. The spring convolutions in the Fig. 5 construction are square in cross section, and the opposed faces of adjacent convolutions are flat and parallel.

The Fig. 8 construction is similar to the Fig. 1 construction except for the mounting of the spring and power element on the support plate.

Support plate 2 in the Fig. 8 construction includes an externally threaded tubular wall portion 40. The uppermost end portions of spring 3 are spiralled through the threads on tubular portion 40 to their illustrated positions. The spiral threads cooperate with the spring convolutions to prevent fluid flow between wall portion 40 and the spring convolutions.

In order to secure the desired movement of member 23 relative to piston 24 the lower wall 41 of member 23 is indented until the interior volume of member 23 is reduced sufficiently to force member 23 away from plate 2 to the Fig. 8 position. Indenting wall 41 eliminates the need for threading and soldering piston 24. The central portion of plate 2 is cupped at 42 to accurately locate piston 24 and prevent its disengagement from plate 2.

The Fig. 1, Fig. 5 and Fig. 7 constructions are noteworthy by reason of their low cost, occasioned principally by reduction in the number of component parts as compared with conventional corresponding constructions.

I claim:

1. A valve comprising an apertured support wall; a tension coil spring having one end engaging said support wall, the spaces between the spring convolutions constituting openable and closable valve ports; the end portion of the spring remote from the support wall being spiralled inwardly in a radial plane to form a seating portion; a temperature responsive power element within the spring and including a cup portion extending through the remote end of the spring, said element also including a shoulder portion pressuringly engaging the seating portion and a piston engaging the support wall; and thermally expansible material within the cup portion for forcing said cup portion away from the support wall on fluid temperature increase so as to open the coil convolutions for the passage of fluid.

2. A valve comprising a support plate having sections thereof turned out of its plane to form a central hub and a plurality of spokes; a coil spring abutting against one face of the support plate, the abutting portion of the spring spiralling inward in a radial plane, and the turned out sections of the support plate being wrapped around the radially spiralled portions to (1) prevent fluid flow between adjacent convolutions of said spiralled portions and (2) form fluid passages in the support plate; and a temperature responsive power element between the central hub and a portion of the spring remote from the support plate for forcing the coil convolutions apart to permit passage of fluid.

3. A valve comprising a one piece support member having a flat planar outer annular area, a tubular section extending from the inner limit of said annular area and out of its plane, spokes radiating inwardly from said tubular sections, and a central hub interconnecting the spokes; a coil spring having its end most convolution tightly encircling said tubular section; the spaces between the spring convolutions constituting openable and closable valve ports; and a temperature responsive power element between the central hub and a portion of the spring remote from the support member for forcing the coil convolutions apart to permit passage of fluid.

4. The combination of claim 3 wherein the tubular section is threaded on its external face and the end most spring convolution is spiralled onto the threads of said tubular section.

5. A valve comprising an apertured support wall; a coil spring engaging said support wall, the spaces between the spring convolutions constituting openable and closable valve ports; a temperature responsive power element within the spring and including a cup portion extending from the end of the spring remote from the support wall; said power element also including a piston having an end portion thereof threadedly engaging the support wall; said power element also including a body of thermally expansible material within the cup portion for forcing said cup portion away from the support wall on fluid temperature increase so as to open the coil convolutions for the passage of fluid.

6. A valve comprising wall means forming a fluid conduit; a support wall extending across said conduit; fluid flow openings in the support wall forming a central hub and radiaitng spokes; a tension coil spring within the conduit and having one end anchored on the support wall, the spaces between the spring convolutions constituting openable and closable valve ports; a temperature responsive power element extending within the coil spring and including a cup member and piston; said piston pressuringly engaging the support wall hub, the cup member pressuringly engaging the other end of the coil spring and extending therethrough so as to have a portion positioned outside of the coil convolutions in the fluid stream; and thermally expansible material within the power element cup member for forcing said cup member away from the support wall on fluid temperature increase so as to open the coil convolutions for the passage of fluid.

References Cited in the file of this patent

UNITED STATES PATENTS

| | | |
|---|---|---|
| 960,080 | Fay et al. | May 31, 1910 |
| 1,246,355 | Thomas | Nov. 13, 1917 |
| 1,665,725 | Aeby | Apr. 10, 1928 |
| 2,093,218 | Thieulin et al. | Sept. 14, 1937 |
| 2,363,279 | Anschicks | Nov. 21, 1944 |
| 2,479,034 | Bolesky | Aug. 16, 1949 |
| 2,656,113 | Drapeau | Oct. 20, 1953 |